United States Patent
Vijlbrief et al.

(10) Patent No.: US 10,590,877 B2
(45) Date of Patent: Mar. 17, 2020

(54) SYSTEM AND METHOD FOR DETECTING AND COUNTERACTING DIESEL ENGINE RUNAWAY

(71) Applicant: DAF Trucks N.V., Eindhoven (NL)

(72) Inventors: Thomas Vijlbrief, Eindhoven (NL); Sebastiaan Elling, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 15/755,698

(22) PCT Filed: Sep. 1, 2016

(86) PCT No.: PCT/NL2016/050611
§ 371 (c)(1),
(2) Date: Feb. 27, 2018

(87) PCT Pub. No.: WO2017/039447
PCT Pub. Date: Mar. 9, 2017

(65) Prior Publication Data
US 2018/0245533 A1 Aug. 30, 2018

(30) Foreign Application Priority Data
Sep. 1, 2015 (NL) .................................. 2015384

(51) Int. Cl.
*F02D 41/04* (2006.01)
*F02D 41/00* (2006.01)
(Continued)

(52) U.S. Cl.
CPC ......... *F02D 41/042* (2013.01); *F02D 31/006* (2013.01); *F02D 41/0055* (2013.01);
(Continued)

(58) Field of Classification Search
CPC ........ F02D 31/00; F02D 31/006; F02D 41/00; F02D 41/0044; F02D 41/0077; F02D 41/14; F02D 41/221; F02D 41/04; F02D 41/042
(Continued)

(56) References Cited

U.S. PATENT DOCUMENTS 5,697,338 A * 12/1997 Hirose ................ F02D 35/0007
123/357
6,273,056 B1 * 8/2001 Shirakawa ............. F02D 21/08
123/305
(Continued)

FOREIGN PATENT DOCUMENTS

CN 2370167 Y 3/2000
DE 112007002017 T5 7/2009
(Continued)

OTHER PUBLICATIONS

Nov. 22, 2016—PCT/NL2016/050611 International Search Report and Written Opinion.

*Primary Examiner* — John Kwon
*Assistant Examiner* — Johnny H Hoang
(74) *Attorney, Agent, or Firm* — Banner & Witcoff, Ltd.

(57) ABSTRACT

A method, device and system for detecting and counteracting a runaway condition in a diesel engine system. The diesel engine system includes an inlet for supplying combustion air to a diesel engine, and an exhaust for relieving the diesel engine from exhaust gas. The diesel engine system further includes an exhaust gas recirculation system for selectively allowing exhaust gas from the exhaust to enter the inlet. A first gas flow path actuator is included in the exhaust gas recirculation system, and a second gas flow path actuator is included in the exhaust. The method, as performed by the system, comprises detection of an actual or potential runaway condition, and in response thereto
(Continued)

deprives the diesel engine of oxygen. Depriving of oxygen is performed by opening the first gas flow path actuator and closing the second gas flow path actuator to cause stalling of the diesel engine. The depriving is accomplished by maximizing recirculation of exhaust gasses to the engine and increasing pressure drop over the exhaust for a first predetermined period of time.

19 Claims, 5 Drawing Sheets

(51) Int. Cl.
　　*F02D 41/22*　　(2006.01)
　　*F02D 31/00*　　(2006.01)
(52) U.S. Cl.
　　CPC ....... *F02D 41/0077* (2013.01); *F02D 41/221* (2013.01); *F02D 2041/0017* (2013.01); *Y02T 10/47* (2013.01)
(58) Field of Classification Search
　　USPC ..... 701/104, 108, 110, 112–114; 123/198 D, 123/198 DB, 198 DC, 198 F, 568.11, 123/568.15
　　See application file for complete search history.

(56) References Cited

U.S. PATENT DOCUMENTS

| | | | |
|---|---|---|---|
| 7,315,778 | B1 | 1/2008 | Kumar |
| 2008/0053087 | A1 | 3/2008 | Swenson et al. |
| 2011/0271928 | A1 | 11/2011 | Siciak et al. |
| 2013/0269654 | A1 | 10/2013 | Xiao et al. |
| 2014/0060485 | A1* | 3/2014 | Ueno ................. F02D 41/0002 123/344 |
| 2015/0308318 | A1* | 10/2015 | Gibble ..................... F01N 5/02 60/615 |
| 2016/0160811 | A1* | 6/2016 | Deb ........................ F02M 26/49 |
| 2016/0304078 | A1 | 10/2016 | Imamura et al. |
| 2018/0017001 | A1* | 1/2018 | Ito ...................... F02D 41/0235 |
| 2018/0202349 | A1* | 7/2018 | Kindl ................. F02B 29/0475 |

FOREIGN PATENT DOCUMENTS

| | | |
|---|---|---|
| DE | 102013206221 A1 | 10/2013 |
| EP | 0921295 A2 | 6/1999 |
| WO | 2015/083696 A1 | 6/2015 |

* cited by examiner

SYSTEM AND METHOD FOR DETECTING AND COUNTERACTING DIESEL ENGINE RUNAWAY

CROSS-REFERENCE TO RELATED APPLICATIONS

This application is a U.S. National Stage application under 35 U.S.C. § 371 of International Application PCT/NL2016/050611 (published as WO 2017/039447 A1), filed Sep. 1, 2016 which claims the benefit of priority to Application NL 2015384, filed Sep. 1, 2015. Benefit of the filing date of each of these prior applications is hereby claimed. Each of these prior applications is hereby incorporated by reference in its entirety.

The invention relates to early detection, prediction, stopping, and prevention of engine runaway in diesel-type internal combustion engines. Engine runaway is defined as a condition when a diesel engine overspeeds at higher and higher speed on an unintended source of energy.

During an engine runaway the engine is revving uncontrolled on fuel from an unintended or unexpected source. This source could be hydrocarbons in the atmosphere sucked into the engine by its air intake system. Trucks operating in these environments typically have a valve mounted in the intake to stop such hydrocarbonated air from entering the combustion chamber, when a runaway condition occurs.

Another source of unintended fuel can be the engine lubrication oil. Engine lubrication oil can enter the combustion chamber by e.g. an engine failure, crankcase oil dilution or after an overfill.

Another way of having an engine runaway is a leaking injector.

In the case of an engine runaway the driver is not able to stop the engine by switching off an engine activation/deactivation switch, such as an engine start or ignition key or switch. With the runaway continuing uncontrolled it will cause excessive smoke emissions or other failure modes.

Diesel engine speed is controlled by the amount of fuel fed to the engine by a designated fuel system. Control over the engine speed ceases to lie with the fuel supply controls of the engine when fuel is fed to the engine via alternative sources. In diesel engines this may be experienced under a variety of circumstances, even resulting in potentially dangerous scenarios. Turning off the engine switch, lowering or shutting down the fuel supply is ineffective to stop the engine in a ruaway situation, and will not remove potential danger. Even disengaging the drive line, which may remove some of the potential danger, may not prevent thermal engine damage. These actions at best only accomplish shutting off the designated fuel source for the engine, while the engine remains able to run uncontrolled on the alternative fuel source. It is clear that the engine under such conditions is unable to be decelerated as a result from the uncontrolled intake of fuel from the alternative fuel source. This scenario is typical for a diesel engine runaway. In a total runaway situation the engine may be driven to full mechanical failure resulting from the stresses sustained as the engine achieves engine speeds (rpm) above its design limits with catastrophic effects. The engine as a result of runaway can cause a thermal event. Yet another alternative fuel source can be the lubrication oil already present in the diesel engine leaking into the inlet.

Diesel engines are known to have the ability to run on lubrication oil, because it has similar combustion properties to diesel fuel. Lubrication oil entering into the inlet often results from a defect in one of the diesel engine systems associated with the inlet. Frequently the specific defect is a broken turbo shaft, as the associated turbo charger is also part of the inlet. It is also a frequent occurrence that a defective diesel injector results in the continuous injection of fuel into the affected cylinder of the diesel engine. In the current state of technology engine runaway is prevented by fitting a fire extinguisher to the inlet for allowing carbon dioxide to be dosed into the diesel engine in order to deprive the engine of oxygen thereby ceasing the combustion process. Other methods involve venting the combustion chambers of engine cylinders operating a decompressor; however, this is often only accomplished after the engine has gained dangerous speeds. In the current state of technology engine runaway is also stopped using an intake air shut-off valve, also known as a choke valve. The choke valve is a valve placed in the air inlet of the engine so that closing the choke valve immediately deprives the engine of oxygen. Further, a known method involving the choke valve is where the valve is enacted after exceeding a maximum engine speed, at which point the engine is already operating under critical conditions. An added problem is that already existing diesel engines in cars or trucks which do not posses such a choke valve would require to be retro-fitted with one. Not all vehicles are suited for such retro-fitting due to lack of space in the engine compartment or unfavorable positioning of the inlet or engine block. Other options for possibly stalling a runaway engine include moving the engine into high gear and allowing it run out, which can lead to undesired traffic situations or engine damage. Accordingly, a need is felt to be able to stall a diesel engine preferably already at the onset of a runaway or at least in early stages before excessive engine speeds are reached, so as to overcome the above mentioned problems. There is further also a need for early detection or prediction of an engine runaway condition.

Accordingly, it is an object of the present invention to provide said ability to overcome or reduce at least one of the disadvantages of the prior art. Further it is an object of this invention to anticipate engine runaway to ensure early detection of the problem to increase the chances of shutting down the engine before the engine sustains damage. It is further also an object of the invention to provide alternative solutions which are less cumbersome in assembly and operation. It is further also an object to anticipate driver behavior during runaway as to improve vehicle driver safety during a runaway event. Alternatively, it is an object of the invention to at least provide a useful alternative.

To this end the invention provides for a method, a system and a safety device or unit as defined in one or more of the appended claims.

Diesel engines often are already fitted with various actuators in gas flow path for controlling a gas flow, such as an exhaust gas recirculation valve (EGR valve), a back pressure valve (BPV), and/or a variable geometry turbine (VGT).

In case of an increased risk of engine runaway and/or when a runaway can possibly occur, e.g. in the case of a broken turbo shaft, a shutdown engine routine will manipulate the available gas flow path actuators to prevent oxygen from entering the combustion chamber. Due to a lack of oxygen the combustion will stop with the result that the engine will stall.

The present invention is able to accomplish depriving the diesel engine from oxygen without requiring the diesel engine systems to be fitted with yet another gas flow path actuator, such as a choke valve in an air inlet tract and its controls. Oxygen deprivation of the diesel engine is accomplished through maximizing recirculation of the exhaust gasses to the diesel engine, using the already present air path or gas flow path actuators in a common diesel engine intake and/or exhaust. thereby it is possible to evade additional expenses and invasive reconstruction of the inlet of such a diesel engine system for the addition of yet another gas flow path actuator. Elevated pressure, which may exist in the inlet due to the recirculating exhaust gasses, can also help to oust any air and with it any oxygen which can be drawn in through either the inlet or alternative locations. All these measures ensure an oxygen deprived environment for the diesel engine to achieve that the engine is stalled. A further benefit is that this provides an exhaust gas flow directed outward from the inlet, the latter has the effect of directing combustible contaminants, such as lubrication oil, away from the engine in an outward direction from the inlet and further ousts volatile combustibles which may originate from the environment, such as methane gas. Further, the invention is able to accomplish monitoring for signs of engine runaway and allowing for preventative measures by warning the driver of such a situation.

According to the invention the method and system for detecting and counteracting a diesel engine runaway condition provides a diesel engine system having a diesel engine, an inlet for supplying combustion air to the diesel engine, an exhaust for relieving the diesel engine from exhaust gas, an exhaust gas recirculation system for selectively allowing exhaust gas from the exhaust to enter the inlet, a first gas flow path actuator in the exhaust gas recirculation system, and a second gas flow path actuator in the exhaust. The method then includes detecting an actual or potential runaway condition, and in response to a detected actual or potential runaway condition depriving the diesel engine of oxygen by opening the first gas flow path actuator, and closing the second gas flow path actuator to cause stalling of the diesel engine. In one embodiment of the method depriving the diesel engine of oxygen is accomplished through maximizing recirculation of exhaust gasses to the engine, and increasing pressure drop over the exhaust for a first predetermined period of time. Causing stalling of the diesel engine can further include interrupting fuel supply to the diesel engine. Causing stalling of the diesel engine can be accomplished with the inlet substantially fully open.

Detecting engine runaway can comprise monitoring actual deceleration of the diesel engine during moments of predefined expected deceleration and comparing actual deceleration with expected deceleration, and determining whether the actual deceleration is less than the expected deceleration for detecting an actually occurring engine runaway. A benefit of monitoring deceleration during moments of expected deceleration is that it anticipates a driver's deceleration response to involuntary engine acceleration. This places detection moments in-line with driver response to unexpected engine behavior and further provides the benefit of regular moments of monitoring such that first signs of impending runaway can be acted upon. A further benefit is that the system does not require to continuously be active and thereby saves working memory use and electricity. Comparing actual deceleration with expected deceleration is advantageously performed at predefined engine operating conditions. When the diesel engine system is a vehicular diesel engine system, the predefined engine operation condition can include actual parameters of vehicle drive line state, or quantity of injected fuel. In a method the former would comprise providing the diesel engine system as a vehicular diesel engine system and using actual parameters such as a vehicle drive line state or injected fuel quantity for the predefined engine operation condition.

The diesel engine system can also include a turbocharger associated with both the exhaust and the inlet, and detecting a potential runaway condition can then also comprise determining an elevated risk of engine runaway by detection of a defect in the turbocharger.

Engine runaway can optionally be detected when engine speed exceeds a predefined maximum. According to an advantageous aspect of the present invention engine runaway is detected when a difference between engine detected actual deceleration and expected engine deceleration exceeds a predefined margin. The predefined margin can also be variable. According to another option or in addition to the preceding option the predefined margin is related to a statistical algorithm that is associated with a deceleration behavior of the diesel engine. An advantage is that this allows for a detection tolerance. The latter enables a detection optimization, minimizing the incidence of misidentification of a runaway engine. It further allows for the use of approximated engine behavior, such as a model based on behavioral data at various operating conditions. It will be understood that an algorithm can be based on such a model. Operating conditions can be engine speed, injected fuel quantity, engine type, age and the load of the vehicle. In case the diesel engine system is a vehicular diesel engine system, the method can also comprise issuing a warning signal and/or a warning message to a vehicle driver about a detected engine runaway condition or risk. The issuance of either a warning signal or a warning message to the vehicle driver can also be complemented by an instruction to turn off an engine switch, if the engine switch is not yet turned off. An advantage of this is that the driver is made aware of the situation allowing the driver timely response to a potentially dangerous situation. The latter also has the advantage that the vehicle drive is enabled to act accordingly to remove himself from a potentially dangerous traffic situation, such as on the high way. The warning can further be provided with road safety instructions. The method can further comprise monitoring the diesel engine during and after the first predetermined period of time for maximizing recirculation of exhaust gasses to the engine, and for increasing pressure drop over the exhaust, to confirm whether stalling of the engine has been accomplished.

The first gas flow path actuator is conveniently formed as an exhaust gas recirculation valve. An optional second gas flow path actuator, is conveniently positioned in the exhaust downstream from where the exhaust gas recirculation system is connected to the exhaust, and is arranged for adjusting the pressure drop over the exhaust to thereby also increase pressure in the exhaust gas recirculation system. Such an optional second gas flow path actuator can conveniently be formed as a back pressure valve. Maximizing the recirculation of exhaust gasses to the engine can also be achieved by fully opening only the first gas flow path actuator. Alternatively or additionally variable timing of the engine inlet and outlet valves may also be employed in depriving the engine of oxygen.

Stalling of the engine according to the invention can further be accomplished by increasing the pressure drop over the exhaust using a third gas flow path actuator provided with the diesel engine system. The diesel engine system can include a turbocharger associated with both the exhaust and the inlet, and the third gas flow path actuator can then be formed as a variable geometry turbine of the turbocharger. A third air path actuator will further be able to provide an alternative for the second gas flow path actuator in the event that the second gas flow path actuator would be damaged or non-operational. The variable geometry turbine further provides an alternative adjustable pressure drop over the exhaust.

It will be understood that the stalling of the engine can be executed by gradually maximizing the pressure drop in the exhaust and minimizing the pressure drop in the part of the exhaust which is connected to the inlet such that exhaust gasses entering the inlet are prevented from entering under a pressure at which damage to inlet structures can occur, such as an inlet filter.

The method can include monitoring engine speed for determining the deceleration of the diesel engine. Monitoring the deceleration of the diesel engine is advantageously performed during a moment of expected deceleration of the diesel engine, and the moment of expected deceleration can be directly after an engine switch has been turned off, and may last at least until a powering down of the diesel engine has been achieved. The engine speed can be determined by an engine speed sensor. It will be understood that engine speed measurements refers to measuring the speed such as the rpm's from which changes in speed over time will be derived. It will further be understood that torque measurements such as the torque or momentum of the drive shaft are also understood to be included in the term engine speed. The engine speed and acceleration relates closely to the energy output which the engine supplies at a given moment. It will be understood that any measurement of the productive energy output of the engine is a measure of speed of the engine and any measurement of the change in the productive energy output of the engine is a measure of deceleration of the engine. It will further also be understood that acceleration is a negative deceleration and that acceleration is included in the definition of deceleration. The actual injected fuel quantity can be determined using an injection pressure sensor, a mass flow sensor, or by detecting deviations from a predefined model.

Detecting a potential runaway condition, or an elevated risk of one occurring, can include detecting presence of hydrocarbons or volatile organic compounds in the inlet.

Detecting whether stalling of the diesel engine has been accomplished can be performed within and after the first predetermined period of time for maximizing recirculation of exhaust gasses to the engine, and for increasing pressure drop over the exhaust. The first period of time can also be extended at least until accomplished stalling of the diesel engine system is detected. The recirculation of exhaust gasses can also be reduced after the first predetermined period of time for maximizing recirculation of exhaust gasses to the engine, and for increasing pressure drop over the exhaust. The recirculation of exhaust gas can also be minimized. The exhaust gas recirculation can be minimized by closing the first gas flow path actuator. It will be understood that recirculation of exhaust gasses also means potential recirculation of exhaust gasses.

The pressure drop over the exhaust can be reduced after the first predetermined period of time for maximizing recirculation of exhaust gasses to the engine, and for increasing pressure drop over the exhaust. It will be understood that pressure drop also means potential pressure drop. At least one of the second gas flow path actuator and optionally the third gas flow path actuator in the exhaust can be arranged for adjusting the pressure drop over the exhaust. The at least one of the second and optional third gas flow path actuators can be fully opened. Detecting whether the diesel engine has stalled can be performed after reducing the recirculation of exhaust gas.

Detecting whether stalling has been accomplished can also comprise monitoring either a single engine associated sensor or a plurality of engine associated sensors, each being associated with the diesel engine for sensing a specific engine related parameter. The engine associated sensor can be a engine speed sensor, a pressure sensor, a gas flow sensor, a temperature sensor or a torque sensor is. Stalling of the diesel engine can be determined to have been accomplished, when the single engine associated sensor or the plurality of engine associated sensors has sensed a value that remains below a sensor specific predetermined threshold value for a second predetermined period of time.

Shutting down an electronic control unit can be enabled after stalling of the diesel engine has been accomplished. The latter accomplishes maintaining the electronic control unit enabled until after stalling has been accomplished. This anticipates driver behavior under a potential runaway condition, wherein a vehicle driver's attempt to turn off the engine would otherwise also result in also turning off the electronic controls unit.

Generally detecting engine operation or stalling can be accomplished by interpreting signals from a variety of sensors, such as but not limited to pressure sensors in the exhaust system or $\Delta_p$-sensors in an EGR-system. Other sensors, such as an engine speed sensor are equally suitable.

The invention will now be further elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

Figure 1:
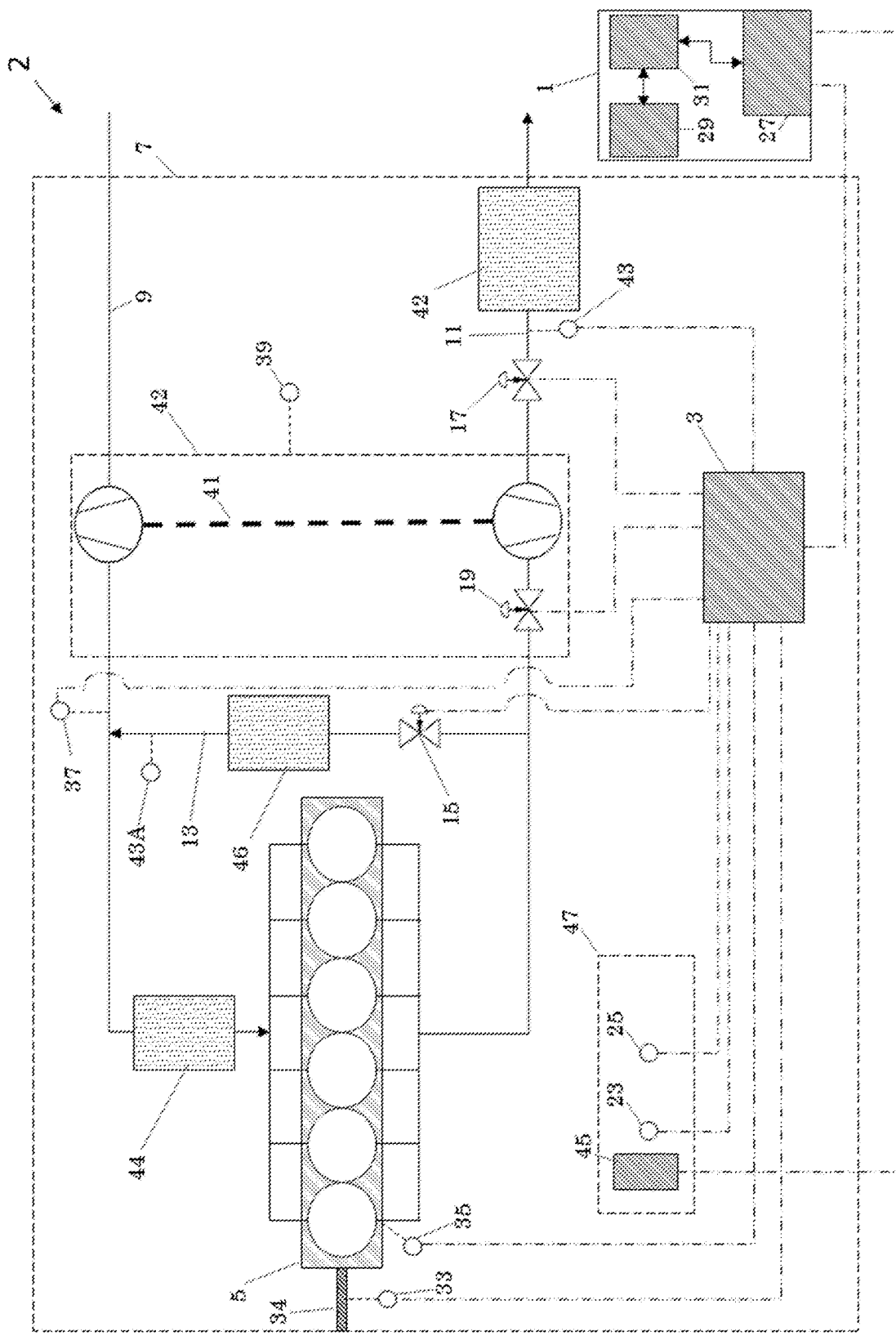
FIG. 1 shows a schematic engine safety setup, for stopping and preventing engine runaway.

FIG. 1 shows an engine safety device 1 in a schematic engine safety setup 2. The engine safety device 1 is arranged for being communicatively connectable with an electronic control unit or ECU 3, arranged as an engine control unit, for detecting engine runaway in a diesel engine 5 which is a part of a diesel engine system 7. The engine safety device 1 is associated with the diesel engine system 7 via the ECU 3. The safety device 1 is further arranged for detecting an increased risk of engine runaway and for accomplishing the stalling of the diesel engine 5 if engine runaway or an increased risk of engine runaway is detected. The engine safety device 1 is further arranged for checking if stalling has been accomplished. The safety device 1 is further arranged for warning a driver of a vehicle propelled by the diesel engine system concerning a detected engine runaway or a detected increased risk of engine runaway. The diesel engine 5 has an inlet 9 and an exhaust 11. The diesel engine system 7 further has an exhaust recirculation system or EGR system 13 connecting the exhaust 11 tot the inlet 9. The device 1 is arranged for controlling a plurality of gas flow path actuators (15, 17, 19) associated with the electronic control unit 3 for stalling the diesel engine 5 over a first predetermined period of time. The electronic control unit 3 is associated with a first gas flow path actuator 15, a second gas flow path actuator 17 and a third gas flow path actuator 19. The first gas flow path actuator 15 is arranged to be located in the EGR system 13 for controlling the recirculation of exhaust gasses to the engine 5. The second gas flow path actuator 17 is arranged to be located in the exhaust 11, downstream from where the EGR system 13 connects to the exhaust 11. The second gas flow path actuator 17 is arranged for adjusting the pressure drop over a predetermined section of the exhaust 11, downstream of where the EGR system 13 connects to the exhaust, and is represented in this example by a back pressure valve (BPV). The third gas flow path actuator 19 is a variable geometry turbine (VGT) arranged to be located in the exhaust 11 also arranged for adjusting pressure drop over the exhaust 11 downstream of where the EGR system 13 connects to the exhaust 11.

Stalling of the diesel engine 5 is accomplished by means of oxygen deprivation, which in turn is accomplished by maximizing the recirculation of exhaust gasses to the engine and by increasing the pressure drop over the exhaust upstream from where EGR system 13 connects to the exhaust. Stalling is achievable using the first, second and third gas flow path actuator 15, 17, 19 which are arranged such that any of the combinations of settings of the first, second and third gas flow path actuator 15, 17, 19, as seen in Table 1, accomplishes depriving the diesel engine 5 of oxygen.

TABLE 1

| gas flow path actuator | combination A setting | combination B setting | combination C setting |
|---|---|---|---|
| first | opened | opened | opened |
| second | closed | closed | opened |
| third | closed | opened | closed |

The first gas flow path actuator 15 is an exhaust gas recirculation valve or EGR valve, and the second gas flow path actuator 17 is a back pressure valve or BPV. The closed setting corresponds to maximum pressure drop over the respective gas flow path actuator, while the opened setting corresponds to minimum pressure drop over the respective gas flow path actuator. It will be understood that the first gas flow path actuator can be provided such that fully opening the first gas flow path actuator will be sufficient to stall the engine in the situation that both the second and third gas flow path actuators are fully opened or do not fully comply with the combinations as presented in Table 1, such as partially opened or partially closed. It will further be understood that pressure drop over the exhaust may be increased by only partially closing at least one of the second and third gas flow path actuators. Maximizing recirculation of exhaust gasses will therefor also be understood to mean furthering, adding to or increasing the recirculation of exhaust gasses to the engine or any combination thereof. The diesel engine 5 is further equipped with a fuel supply 21 which controls the amount of fuel delivered to the diesel engine 5. The safety device 1 is arranged for closing the fuel supply 21 for depriving the diesel engine 5 of diesel fuel.

In an alternative embodiment a third gas flow path actuator 19 is not used, the first gas flow path actuator is opened and the second is closed to accomplish stalling the diesel engine 5.

The device 1 is also arranged for anticipating driver behavior response to engine runaway. In response to engine runaway a driver will likely respond by attempting to decelerate the engine. Deceleration or stopping of the diesel engine 5 can occur by interrupting the fuel supply by keying-off the engine. Therefor moments in which the driver reduces fuel supply or attempts to key-off the diesel engine 5 are suspect moments. The safety device 1 is therefor arranged to determine the occurrence of moments of expected deceleration and is arranged to receive sensor signals from a fuel supply sensor 23 and a key contact sensor 25.

The safety device 1 is equipped with a communication unit 27 for being communicatively connectable to the ECU 3, a processor unit 29 for processing sensor data for determining the engine deceleration and a memory storage 31 for storing sensor information data and data associated with expected engine deceleration. The processor unit 29 is arranged to store data in the memory storage 31 and retrieving data from the memory storage 31. The processor unit 29 is arranged to send commands to the ECU 3 via the communication unit 27 related to changing the settings of the first, second and third gas flow path actuators 15, 17, 19 and the fuel supply 21.

The communication unit 27 is a transmitter and receiver with a cable port (not shown, but conventional) for receiving or extending a communications cable.

The safety device 1 is arranged to receive sensor data for determining the engine deceleration and the expected engine deceleration. For determining the deceleration of the diesel engine 5 the safety device 1 is arranged for receiving sensor data from an engine speed sensor 33 associated with the engine shaft 34. Optionally, the engine speed sensor 33 can be a torque sensor. For determining the expected deceleration the device 1 is arranged for determining the injected fuel quantity. For determining the injected fuel quantity the device 1 is associated with an injected fuel pressure sensor 35 or a micro-flow sensor associated with the diesel engine 5 for determining the injected fuel quantity. Options other than an injection pressure sensor, or a mass flow sensor, also includes use of a predefined model. The safety device 1 is arranged to use the data from the injected fuel pressure sensor 35 to, in combination with engine specific data, determine the expected engine deceleration. It will be understood that the fuel quantity can be indirectly measured. Measuring means such as the injection pressure sensor or the injected fuel quantity sensor will therefor be understood not to be limited to a single sensor. Such fuel quantity measuring means can also include an arrangement of sensors and/or other devices, such as a timer, for deducing, determining or approximating the injected fuel quantity, and a predefined model. Alternatively, the safety device 1 uses the injected fuel quantity as measurement to establish the combustion energy and translates the combustion energy to the expected engine acceleration via Newtonian relations using the processor unit 29.

Engine runaway is detected by the device 1 if the actual deceleration is less than the expected deceleration. Alternatively, engine runaway is detected by the device 1 if the difference between the expected deceleration and the actual deceleration is greater than a predefined detection value. In yet another embodiment the predefined detection value includes at least one of a constant, a variable related to engine speed or a value related to a statistical algorithm associated with the deceleration behavior of the diesel engine 5.

For detecting an increased risk of engine runaway the safety device 1 in one example is optionally arranged for detecting breakage of a turbo shaft 41 of a turbo charger 40, and/or for detecting hydrocarbons in the inlet 9. For detecting the turbo shaft 41 to be broken the device 1 is associated with a turbo speed sensor 39 for measuring the speed of the turbo shaft 41. For detecting hydrocarbons in the inlet 9 the device 1 can be associated with a volatile organic compound sensor 37. It is also possible to use an oil level sensor to detect an overfill of the engine sump, which may also result in a presence of unintended hydrocarbons in the inlet. The detection of a broken turbo shaft 41 and presence of hydrocarbons in the inlet is interpreted by the device 1 as an increased risk of engine runaway.

The device 1 is further in communication with the engine speed sensor 33 for determining if the diesel engine 5 has successfully stalled after a first predetermined period of time. The device 1 is further also in communication with a pressure sensor 43 in the exhaust 11 to determine if the diesel engine has successfully stalled. The diesel engine system is further equipped with an exhaust after treatment system or EAS 42. The pressure sensor 43 is arranged for measuring at least one of a pressure at a predefined point in the exhaust 11 or a pressure drop over a part of the exhaust 11 in the EAS 42, in the latter case the pressure sensor 43 is a differential pressure sensor. Also an optional $\Delta_p$-sensor 43A in the EGR-system 13 may be in communication with the device 1. The optional $\Delta_p$-sensor 43A may also be used in alternative to the pressure sensor 43 to detect stalling of the engine.

When the engine speed exceeds a predefined threshold after the first time period the first predefined time period is extended. Determining whether the diesel engine has successfully stalled upon closing the first gas flow path actuator 15 and opening the second and third gas flow path actuators 17, 19 includes monitoring the engine speed sensor 33 after the first predefined time period. If the engine speed does not remain below the predefined threshold for a further predefined period time after the first predefined period of time, stalling of the diesel engine 5 is reinitiated. The predefined engine speed threshold is substantially zero.

The safety device 1 is arranged to confirm the diesel engine 5 to have successfully stalled if the engine speed remains below the predefined threshold for the further predefined period of time after the first predefined period of time. The device 1 is arranged for powering off the ECU 3 when the engine is confirmed to have successfully stalled. Powering off, or power down is a routine of shutting down the ECU in a methodical way, concluding by switching off the power.

The device 1 may further be optionally associated with a human interface 45 for warning the driver when engine runaway or increased risk of engine runaway is detected. The human interface is located in a driver cabin 47 of a vehicle powered by the diesel engine system 7. The human interface 45 is further arranged for allowing the driver to manually initiate stalling the diesel engine 5. The human interface 45 is further also arranged to request the drivers permission for powering off the ECU 3 after the diesel engine 5 is confirmed to have successfully stalled. The human interface 45 is further arranged for emitting an acoustic warning signal when the device 1 initiates stalling the diesel engine 5. Alternatively, the human interface 45 can be arranged to emit visual warnings, such as a turning on a colored light such as an LED signal, a flashing light or LED and a visual warning on the interface. The human interface 45 can conveniently be arranged as a touch screen display. The human interface 45 can further also be arranged to emit a spoken warning message in the language of the driver. The spoken warning message relates to engine runaway, and instruction on removing the vehicle from road traffic. Alternatively, the vehicle is a boat, in which case the instructions relate to fire prevention, contacting the coast guard and the evacuation of the vessel. As explained above this warning system is merely an optional part of the invention.

In the diesel engine system 7 the inlet 9 is further associated with a first heat exchanger 44. The exhaust gas recirculation system further includes a second heat exchanger 46. The first heat exchanger 44 being a inlet gas cooler, and the second heat exchanger 46 being a cooler for recirculating exhaust gas.

Figure 2:
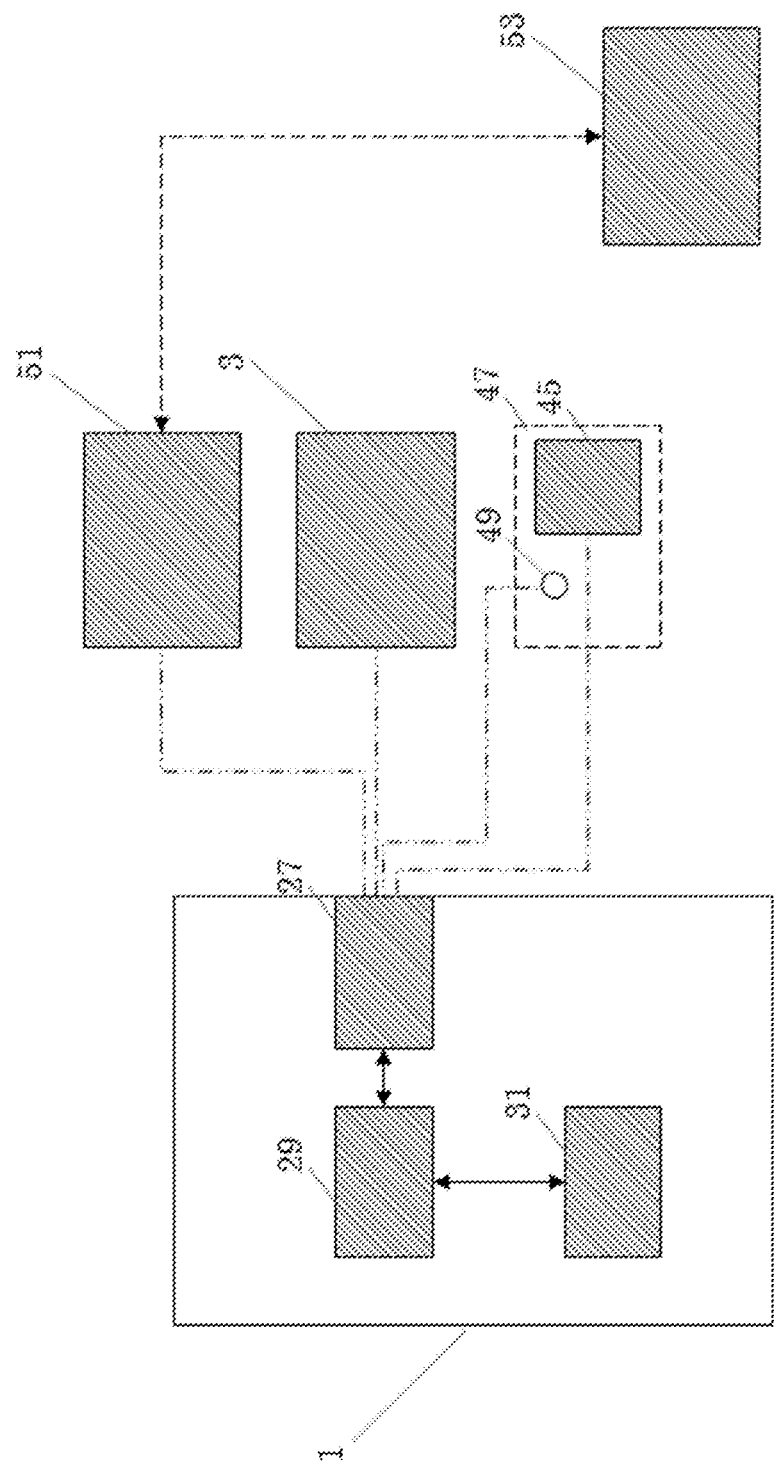
FIG. 2 shows a schematic engine safety device for stopping and preventing engine runaway.

In FIG. 2 the engine safety device 1 is arranged as an onboard device and is shown schematically. In this embodiment the device 1 is again arranged to be communicatively connectable to the ECU 3 and the human interface 45 in the driver cabin 47 using the communication unit 27. The device 1 is also again associated with the first, second and third gas flow path actuators 15, 17, 19, via the ECU 3. Alternatively, the device 1 can also be directly associated with the first, second and third gas flow path actuator 15, 17, 19 using the communication unit 27. Further, the device 1 is associated with the fuel supply sensor 23, the key contact sensor 25, the engine speed sensor 33, the injected fuel pressure sensor 35, the volatile organic compound sensor 37, the turbo speed sensor 39, and the pressure sensor 43 via the ECU 3. Alternatively, the device 1 can be arranged such that the device 1 is associated with each of the fuel supply sensor 23, the key contact sensor 25, the engine speed sensor 33, the injected fuel pressure sensor 35, the volatile organic compound sensor 37, the turbo speed sensor 39 and the pressure sensor 43 either directly or via the ECU 3. The device can further be associated with an optional emergency switch 49 which is placed in the direct vicinity of the human interface 45 in the driver cabin 47. The optional emergency switch 49 is manually operable and enables the driver to initiate the stalling of the diesel engine 5. Alternatively, the switch can be a button, a slide, a turn key, or any other means of human interfacing for relaying a signal to the device 1 for initiating stalling the diesel engine 5. Alternatively, the emergency switch is a feature which is part of a menu function of the human interface 45. If an increased risk of engine runaway is detected, but engine runaway itself has not been detected yet, the device 1 is arranged to warn the driver of the increased risk of engine runaway for allowing the driver to remove him or herself from traffic. The warning can be a spoken warning message in the language of the driver, and the warning is further displayed on the human interface 45. The warning relates to instructions for the driver to get off the road and key-off the engine switch. From the moment of the warning or the moment or detection of increased risk of engine runaway, these are equivalent, the device 1 will wait another predetermined, waiting period, of time before initiating the stalling of the diesel engine 5. This will allow the driver to remove him or herself from traffic. If during the waiting period engine runaway is detected the device 1 is arranged to initiate stalling the diesel engine 5 regardless of the waiting period.

The device 1 further has the processor unit 29 associated there with. The processor unit 29 is further arranged for processing and interpreting sensor information for determining engine runaway and increased risk of engine runaway. The processor unit 29 is communicatively connected to the communication unit 27 and the memory storage 31. The memory storage 31 is preprogrammed to contain reference data related to the expected deceleration of the diesel engine 5 in the diesel engine system 7. Alternatively, the memory storage 31 is preprogrammed to contain reference data related to the expected deceleration of various diesel engines in different diesel engine systems. In a convenient embodiment the device is preprogrammed to determine the particular diesel engine 5 and diesel engine system 7 and using the reference data related to the expected deceleration of the diesel engine 5 in the diesel engine system 7. In the alternative embodiment the diesel engine 5 and diesel engine system 7 are determined by the device 1 through operator input. The communication unit 27 is further arranged for being connectable to a long range communication unit 51 present in the vehicle for communicating the increased risk of engine runaway or engine runaway to a remote server 53. Alternatively, device 1 is arranged to contain the long range communication unit 51 as an integral element. The long range communication unit 51 is either a technical mobile communication unit, a radio, a WiFi transmitter/receiver, satellite uplink, telephone transmitter/receiver.

Figure 3:
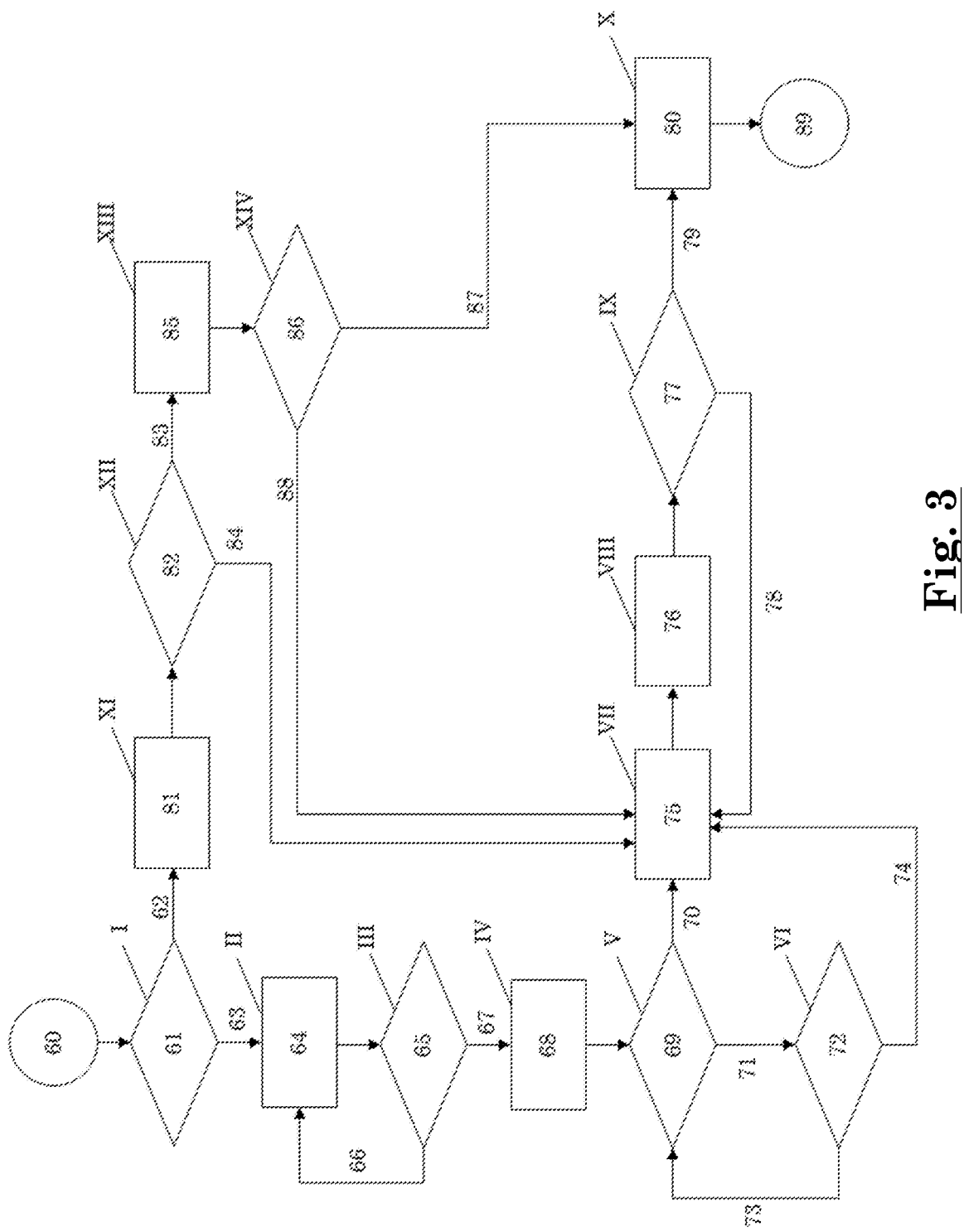
FIG. 3 is a flow diagram schematically showing the method steps for stopping and preventing engine runaway.

FIG. 3 identifies the following steps in the method for stopping and preventing engine runaway. Table 2 shows the reference numbers and their designation as applicable to FIG. 3.

TABLE 2

| Reference | Designation | Reference | designation |
|---|---|---|---|
| 60 | Start | 75 | Step VII |
| 61 | Step I | 76 | Step VIII |
| 62 | No | 77 | Step IX |
| 63 | Yes | 78 | No |
| 64 | Step II | 79 | Yes |
| 65 | Step III | 80 | Step X |
| 66 | No | 81 | Step XI |
| 67 | Yes | 82 | Step XII |
| 68 | Step IV | 83 | No |
| 69 | Step V | 84 | Yes |
| 70 | No | 85 | Step XIII |
| 71 | Yes | 86 | Step XIV |
| 72 | Step VI | 87 | No |
| 73 | No | 88 | Yes |
| 74 | Yes | 89 | End |

In step I (61) the method involves checking whether the engine switch of the engine is turned on. If found on, step I leads to step II, if found off step I will lead to step XI.

In step II (64) the deceleration of the engine is monitored. This occurs at expected moments of engine deceleration and during steady intervals, such as moments wherein the fuel supply is decreased. Step II leads to step III.

In step III (65) the monitored deceleration of the engine is compared to the expected deceleration of the engine. If the deceleration of the engine is slower (i.e. less) than the expected deceleration of the engine within a predefined margin, engine runaway is detected. When engine runaway is detected step III leads to step IV, if engine runaway is not detected step III leads to step II and monitoring of expected moments of engine deceleration is continued.

In step IV (68) the fuel supply is closed and a warning related to the detected engine runaway is given to the driver in the form of a spoken acoustic warning and a LED or other light signal in the driver cabin 47. The warning further relates to instructions to the driver for improving traffic safety and turning off the engine switch of the diesel engine 5. Step IV leads to step V.

In step V (69) the method checks whether the engine switch is turned on. When the engine switch is found on, step V leads to step VI, if the engine switch is found off step V leads to step VII.

In step VI (72) the driver is given a predetermined compliance period to react to the warning and/or to comply with instructions issued in step IV before checking the effectiveness of a driver reaction. When the driver complies with the instruction to turn off the engine switch step VI leads to step VII upon compliance. If the driver does not comply with the instruction to turn off the engine switch step VI returns to step V after the predetermined compliance period elapses. The predetermined compliance period being between 0-30 seconds, preferably 0-15 seconds, and more preferably between 0-5 seconds and even more preferably between 0-3 seconds. In the present example the driver at all times remains leading in a decision whether or not to stop, or interrupt operation of the engine.

In step VII (75) the first, second and third gas flow path actuator 15, 17, 19 as seen in FIG. 2 are moved to the settings belonging to combination A as seen from Table 1 to maximize the recirculation of exhaust gas to the diesel engine 5 leaving the inlet 9 opened and stall the diesel engine 5 by oxygen deprivation. Step VII leads to step VIII.

In step VIII (76) the method involves monitoring the diesel engine 5 for life signs. Life signs include an engine speed over zero and pressure in the exhaust or a pressure drop over a section of the exhaust 11 associated with an running engine. The method further involves checking whether the diesel engine does not display any life signs and thus can be concluded to have successfully stalled. Stalling is considered to have been accomplished when the engine speed is substantially zero and the pressure in the exhaust or the pressure drop over the section of the exhaust 11 does not imply a running engine.

In step IX (77) the method involves checking whether stalling has been accomplished by moving the first gas flow path actuator 15 in a closed position and moving the second and third gas flow path actuator 17, 19 into an opened position. The life signs are monitored for a further predetermined period of time and if the diesel engine 5 does not display life signs over the further predetermined period of time the stalling of the diesel engine 5 is considered to have been accomplished. If life signs emerge the stalling is considered to have been unsuccessful and the process is repeated. If the stalling is considered to be accomplished step IX leads to step X, if the stalling is considered unsuccessful step IX leads to step VII.

In step X (80) the ECU 3 is powered off.

In step XI (81) the method involves monitoring for an increased risk of engine runaway arising. Thereto, the inlet 9 is monitored for the presence of hydrocarbons using a volatile organic compound sensor 37 and the turbo charger 40 is monitored for a broken turbo shaft 41 using a turbo speed sensor 39. The detection of hydrocarbons and the sensor readings from the turbo speed sensor 39 associated with a broken turbo shaft 41 are indicative of an increased risk of engine runaway. The sensor readings can also be compared with a predefined model.

In step XII (82), the method involves checking if increased risk of engine runaway is detected. When the increased risk of engine runaway is detected step XII leads to step VII, if the increased risk of engine runaway is not detected step XII leads to step 13.

In step XIII (85) deceleration of the engine is monitored. Step XIII leads to step XIV.

In step XIV (86) the detected deceleration of the diesel engine 5 is compared to the expected deceleration of the diesel engine 5. If the detected deceleration of the diesel engine 5 does not satisfy the expected deceleration of the engine within a predefined margin, such as the detected deceleration being less than the expected deceleration, engine runaway is detected. When engine runaway is detected step XIV leads to step VII, if engine runaway is not detected step XIV leads to step X.

Figure 4:
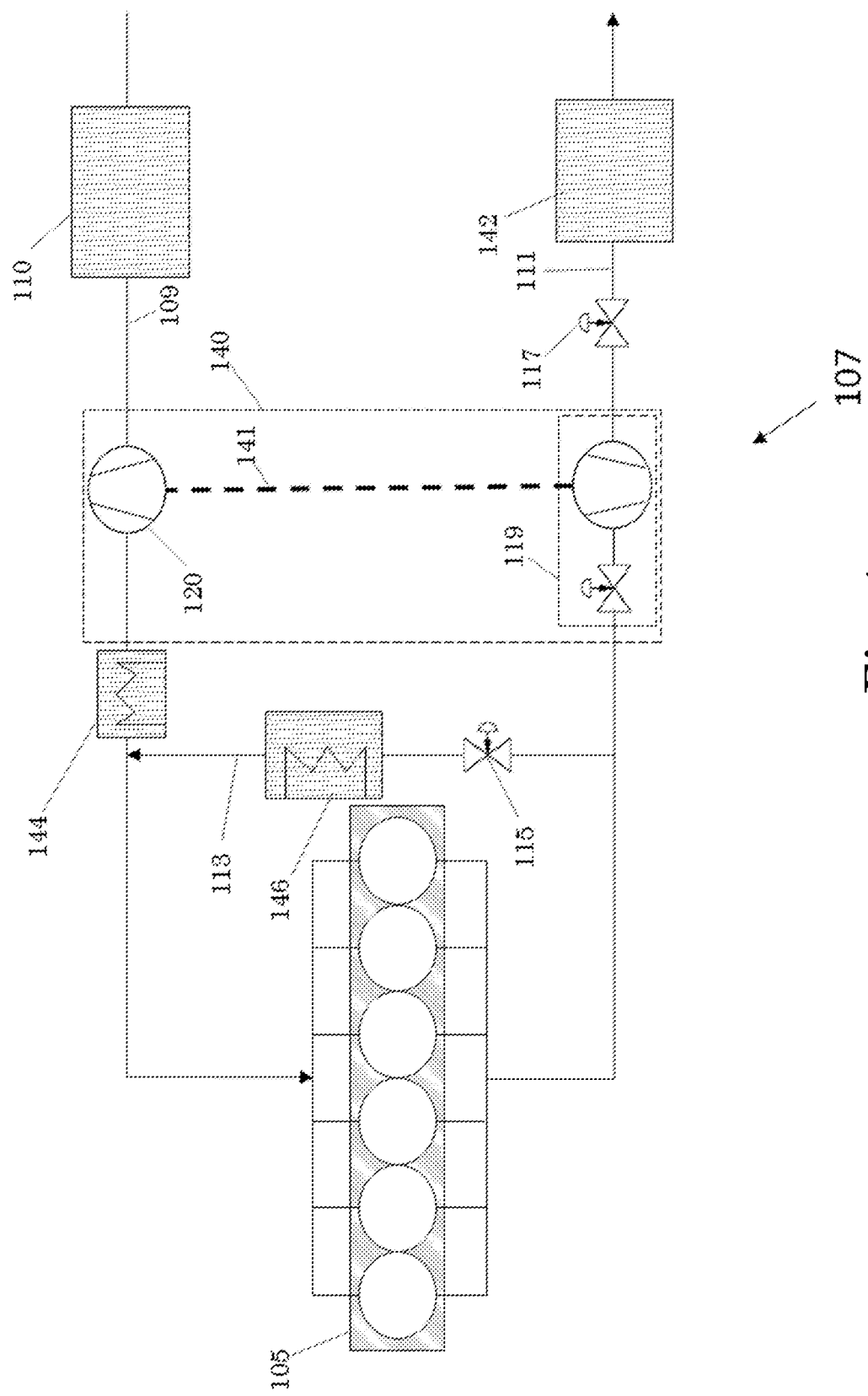
FIG. 4 shows a particular embodiment of engine system according to the invention.
Figure 5:
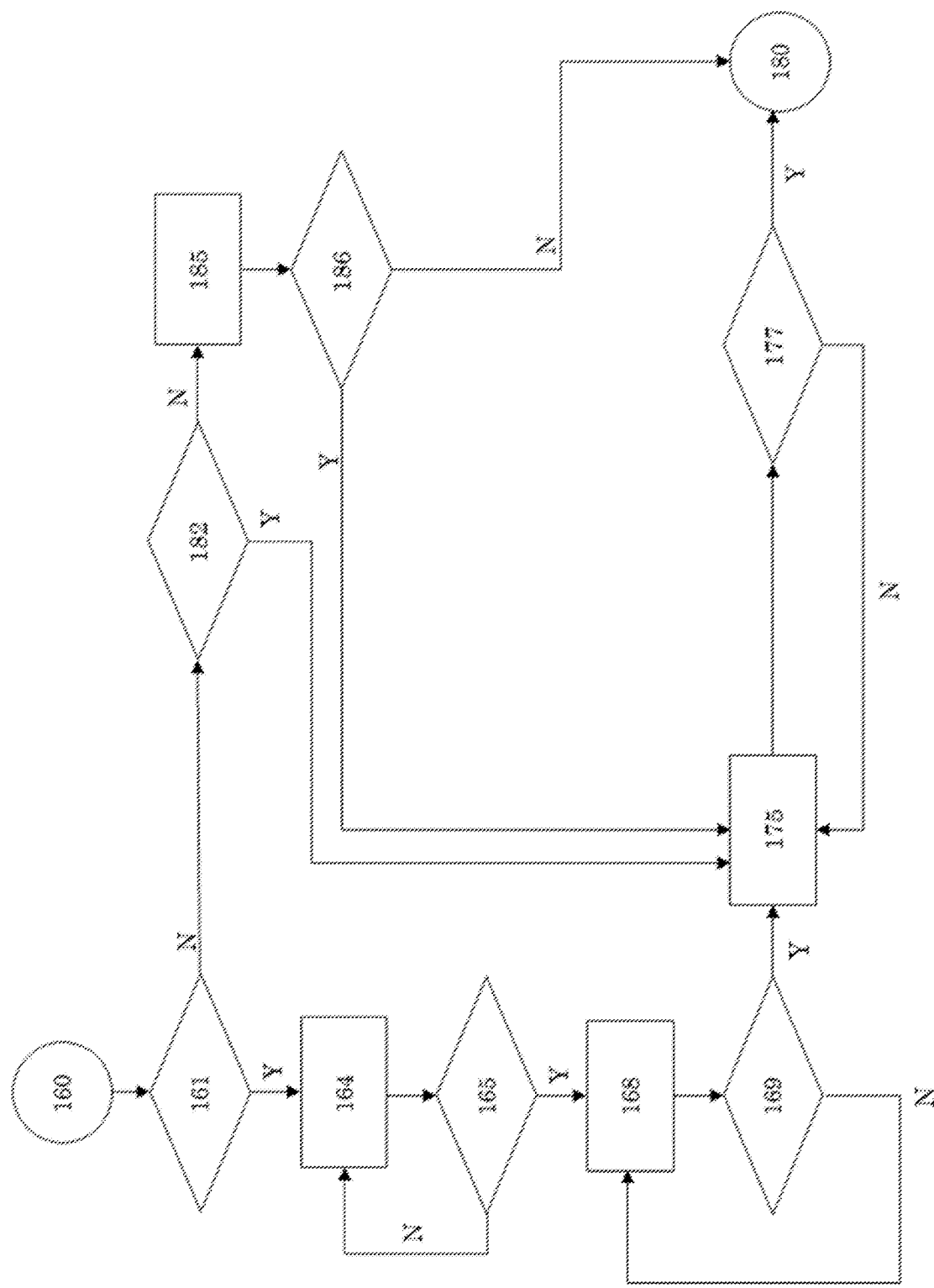
FIG. 5 is a flow diagram of an engine runaway prevention method associated with the engine system of FIG. 4.

In a particular example, illustrated in FIGS. 4 and 5, FIG. 4 merely shows a typical diesel engine system 107, including diesel engine 105 with various ancillaries. Reference numerals used in FIGS. 4 and 5 generally correspond to those used to denote similar entities in FIGS. 1-3, but for the addition of a full "100". An inlet 109, leading to the engine 105, includes an air filter 110, a compressor 120 of a turbo charger 140, and a charge air cooler 144. An exhaust 111, leading from the engine 105, includes a variable geometry turbine or VGT 119, a back pressure valve or BPV 117, and an exhaust gas after treatment system or EAS 142. The variable geometry turbine or VGT 119 of the turbo charger 140 drives the compressor 120 through a drive shaft 141. Furthermore an exhaust gas recirculation system or EGR-system 113 is arranged between the exhaust 111 and the inlet 109 to reduce the operating temperature of the engine 105, by reducing oxygen in the inlet 109. To control the flow of recirculated exhaust gas an EGR-valve 115 is provided in the EGR-system 113. Optionally an EGR-cooler 146 may also be included in the EGR-system 113. Control of the EGR-valve 115, the BPV 117, and the VGT 119, representing the first, second and third gas flow path actuators, is effected by an electronic engine control unit or ECU (not shown, but similar to electronic control unit 3), which can perform the method steps of FIG. 5.

FIG. 5 shows an indicative flow diagram of a process of successive method steps for preventing, or more specifically for detecting and counteracting, engine runaway. The process starts with step 160, when an engine power up condition applies. From step 160 the process continues to step 161 for checking whether the engine switch is on. When the engine switch is found to be on in step 161, the process continue to step 164 of monitoring engine deceleration at predefined conditions. In step 165 it is checked whether a detected deceleration is less than an expected deceleration. When the detected deceleration corresponds within reasonable margins to the expected deceleration at the predefined condition, the process returns to step 161. If however it is determined that the detected deceleration is less than expected, the process continue to step 168 to issue a driver warning. After issuance of a driver warning in step 168, it is checked in step 169, for a predefined period of driver reaction time, whether the engine switch is switched off, or remains on. When the engine switch is switched off upon elapse of the predefined period of reaction time, the process continues from step 168 via step 169 to step 175, which adjusts at least the first and second gas flow path actuators (115, 117 in FIG. 4), and optionally the third gas flow path actuator (119 in FIG. 4), to assume a position that will eliminate oxygen from the engine inlet (109 in FIG. 4), and cause the engine (105 in FIG. 4) to stall. In a next step 177 it is verified, after a predefined period of time, whether or not the engine (105) has indeed stalled. When step 177 determines that the engine (105) has stalled the process ends at step 180, which corresponds to an engine power down condition. If no stalling of the engine is detected by step 177, then the process continues the actions of step 175 for a further period of time.

If in step 161 it is determined that the engine switch is off, then the process continues with step 182, in which it is determined whether the exists an increased risk of runaway. When step 182 has determined an increased risk of runaway, then the process is directed to step 175 for the actions and determination described above. If step 182 determines no increased risk of runaway, the process is continued with step 185, which monitors engine deceleration at predefined conditions, and proceeds to step 186. In step 186 it is established whether the detected deceleration is, within predefined margins, less than an expected deceleration at the relevant predefined condition. When deceleration is indeed less that expected in step 186, the process continues to step 175 for the actions to cause engine stalling by depletion of oxygen. If step 186 determines no occurrence of a runaway condition, the process is directed directly to step 180 to allow the engine power down condition to take effect.

Detection of an engine runaway includes that during normal engine operation and just after key-off (engine switch off), an actual driveline state (open or closed) and an actual quantity of injected fuel are monitored. Under predefined conditions of these parameters the actual engine deceleration is compared with expected engine deceleration. If the actual deceleration is less than expected an engine runaway is detected. While monitoring is continuous, detecting of engine runaway may optionally be initiated only periodically.

Active measures to stall an engine include that a shutdown engine functionality evaluates the input parameters, runaway detected and other risk events, such as the detection of a broken turbo shaft, and decides shortly after the moment the driver switches off the engine whether the engine runaway prevention functionality should become active. Additional risk events, such as the broken turbo shaft entry conditions are also a trigger for the runaway prevention functionality in order to reduce the risk of an actual runaway to occur.

The runaway prevention functionality will preferably ensure that, after the driver switches off the ignition key, that the gas flow path actuators (EGR valve and BPV) are manipulated towards the position at which the pressure drop over the exhaust is increased and the pressure drop over the EGR system is minimized. This corresponds with opening the EGR valve and closing the BPV.

From this moment onwards the engine speed and possibly other sensors indicating a running engine, like pressure and flow sensors, are monitored and compared to thresholds. Other sensor outputs indicating that the engine is running could be monitored besides the engine speed alone in order to reduce false or fail diagnostics. When all signs of a running engine are below certain thresholds for a given period of time, the engine is assumed to be stalled. Now a confirm engine shutdown procedure is entered.

During this confirm engine shutdown phase the gas flow path actuators (EGR valve and BPV) are manipulated towards their normal power off positions. By monitoring the engine speed and possibly other sensor outputs indicating a running engine, and comparing them with thresholds for a given period of time, the engine shutdown is confirmed. When this is the case the power down can continue, if not the shutdown engine functionality will try again to stall the engine.

When in FIG. 4 the VGT 119 is completely closed, this need not be part of the solution because a likely source of external fuel is engine oil from a broken turbo shaft. The VGT 119 can therefore be blocked, but nevertheless a fully closed VGT 119 can assist in increasing pressure drop over the exhaust.

Accordingly there is described a method, device 1, and system 2 for detecting and counteracting a runaway condition in a diesel engine system 7; 107. The diesel engine system 7; 107 includes an inlet 9; 109 for supplying combustion air to a diesel engine 5; 105, and an exhaust 11; 111 for relieving the diesel engine from exhaust gas. The diesel engine system 7; 107 further includes an exhaust gas recirculation system 13; 113 for selectively allowing exhaust gas from the exhaust 11; 111 to enter the inlet 9; 109. A first gas flow path actuator 15; 115 is included in the exhaust gas recirculation system 13; 113, and a second air path actuator 17; 117 is included in the exhaust 11; 111. The method, as performed by the system 2, comprises detection of an actual or potential runaway condition, and in response thereto deprives the diesel engine 5; 105 of oxygen. Depriving of oxygen is performed by opening the first gas flow path actuator 15; 115, and by closing the second gas flow path actuator 17; 117 to cause stalling of the diesel engine. The depriving is accomplished by maximizing recirculation of exhaust gasses to the engine 5; 105 and increasing pressure drop over the exhaust 11; 111 for a first predetermined period of time.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Method for detecting and counteracting a runaway condition in an operator controlled diesel engine system, said diesel engine system comprising:
   a diesel engine, an inlet for supplying combustion air to the diesel engine, an exhaust for relieving the diesel engine from exhaust gas, an exhaust gas recirculation system for selectively allowing exhaust gas from the exhaust to enter the inlet, and a first gas flow path actuator in the exhaust gas recirculation system;
   wherein the method comprises:
   detecting, with an engine control unit (ECU), an actual or potential engine runaway condition in the diesel engine system; and
   allowing an operator to effect stalling of the diesel engine in response to a detected actual or potential runaway condition by depriving the diesel engine of oxygen by opening the first gas flow path actuator for causing stalling of the diesel engine, said diesel engine system further comprising:
   a second gas flow path actuator in the exhaust, and enabling closing of the second gas flow path actuator in conjunction with opening of the first gas flow path actuator for contributing to stalling of the diesel engine,
   wherein depriving the diesel engine of oxygen is accomplished through:
      maximizing recirculation of exhaust gasses to the engine; and
      increasing pressure drop over the exhaust for a first predetermined period of time, and
   wherein the method comprises monitoring the diesel engine during, and after the first predetermined period of time for confirming if stalling of the engine has been accomplished, and further wherein the causing of stalling of the diesel engine is accomplished with the inlet substantially fully open.

2. Method according to claim 1, wherein causing stalling of the diesel engine further includes interrupting fuel supply to the diesel engine.

3. Method according to claim 1, wherein detecting engine runaway comprises monitoring actual deceleration of the diesel engine during moments of predefined expected deceleration and comparing actual deceleration with expected deceleration, and determining whether the actual deceleration is less than the expected deceleration for detecting an actually occurring engine runaway.

4. Method according to claim 1, wherein the diesel engine system further comprises a turbocharger associated with both the exhaust and the inlet, and wherein the detecting of the actual or potential runaway condition comprises determining an elevated risk of engine runaway by detection of a defect in the turbocharger.

5. Method according to claim 1, wherein engine runaway is detected when a difference between engine detected actual deceleration and expected engine deceleration exceeds a predefined margin.

6. Method according to claim 1, wherein the diesel engine system is a vehicular diesel engine system, wherein the operator is a vehicle driver, and wherein the method further comprises issuing at least one of a warning signal and a warning message to the vehicle driver about a detected engine runaway condition or risk.

7. Method according to claim 1, wherein maximizing the recirculation of exhaust gasses to the engine is achieved by fully opening the first gas flow path actuator, and wherein the stalling the engine is further accomplished by increasing the pressure drop over the exhaust using a third gas flow path actuator provided with the diesel engine system, the diesel engine system further comprising:
   a turbocharger associated with both the exhaust and the inlet, and wherein the third gas flow path actuator is a variable geometry turbine of the turbocharger.

8. Method according to claim 1, wherein the method comprises detecting if stalling of the diesel engine has been accomplished within and after the first predetermined period of time, and wherein the method comprises extending the first period of time at least until accomplished stalling of the diesel engine system is detected.

9. Method according to claim 1, wherein the method further includes reducing the recirculation of exhaust gasses after the first predetermined period of time, and wherein the recirculation of exhaust gas is minimized.

10. Method according to claim 1, wherein detecting if stalling has been accomplished comprises monitoring one of a single engine associated sensor and a plurality of engine associated sensors, each being associated with the diesel engine for sensing a specific engine related parameter.

11. Method according to claim 1, further comprising enabling shutting down an electronic control unit after stalling of the diesel engine is accomplished.

12. System for performing functions of detecting and counteracting a runaway condition in a diesel engine system, wherein the diesel engine system comprises:
a diesel engine, an inlet for supplying combustion air to the diesel engine, an exhaust for relieving the diesel engine from exhaust gas, an exhaust gas recirculation system for selectively allowing exhaust gas from the exhaust to enter the inlet, and a first gas flow path actuator in the exhaust gas recirculation system; and wherein the system is arranged for detecting, with an engine control unit (ECU), engine runaway in the diesel engine system, and for maximizing exhaust gas recirculation for a first predetermined period of time by opening the first gas flow path actuator to allow stalling of the diesel engine to be effected in response to a detected runaway,
wherein the diesel engine system includes a second gas flow path actuator in the exhaust, and wherein the system is further arranged for increasing pressure drop over the exhaust by closing the second gas flow path actuator in conjunction with the opening of the first gas flow path actuator, and
wherein the system is arranged to be able to determine actual deceleration of the diesel engine and compare the actual deceleration of the diesel engine to an expected engine deceleration, and further wherein the system is arranged for causing said stalling of the diesel engine with the inlet substantially fully open.

13. System according to claim 12, wherein the diesel engine system further comprises a third gas flow path actuator in the exhaust for increasing pressure drop over the exhaust.

14. System according to claim 12, wherein the system is formed as a retro-fittable auxiliary onboard safety unit for association with an engine control unit, and wherein the safety unit is arranged for sending commands to an electronic control unit relating to adjustment of the first and second gas flow path actuators, and for controlling the first and second gas flow path actuators via the electronic control unit.

15. System according to claim 12, wherein the system is further arranged to check whether stalling of the engine has been accomplished during and after elapse of the first predetermined period of time.

16. System according to claim 12, arranged for comparing detected actual deceleration of the diesel engine to pre-defined expected deceleration for detecting engine runaway.

17. System according to claim 16, wherein the system is further arranged for determining the expected deceleration of the diesel engine using information about injected fuel quantity.

18. System according to claim 16, wherein the system is arranged for detecting engine runaway when the difference between engine deceleration and expected engine deceleration exceeds a predefined margin.

19. System according to claim 12, wherein the system is arranged for warning a vehicle driver, and wherein the warning signal is at least one of an acoustic alarm, a light signal, and a spoken warning using an associated sound system such as a speaker.

* * * * *